United States Patent [19]

Jones, Jr.

[11] 4,131,110
[45] Dec. 26, 1978

[54] SOLAR ENERGY ABSORBER

[76] Inventor: J. Paul Jones, Jr., 644 Valley View La., Wayne, Pa. 19087

[21] Appl. No.: 757,487

[22] Filed: Jan. 6, 1977

[51] Int. Cl.² ............................................. F24J 3/02
[52] U.S. Cl. .................................... 126/271; 165/171; 285/189; 285/DIG. 16
[58] Field of Search ............... 126/270, 271; 237/1 A; 165/169, 170, 171, 144; 285/189, 192, DIG. 16, 423

[56] References Cited

U.S. PATENT DOCUMENTS

| 3,052,228 | 9/1962 | Okuda | 126/271 |
| 3,277,883 | 10/1966 | Rowekamp | 126/271 |
| 3,314,414 | 4/1967 | Rowekamp | 126/271 |
| 3,744,806 | 7/1973 | Keyser | 285/192 |
| 3,997,195 | 12/1976 | Bartholomew | 285/DIG. 16 |
| 4,038,970 | 8/1977 | D'Ascoli et al. | 126/271 |
| 4,060,070 | 11/1977 | Harter | 126/271 |
| 4,060,072 | 11/1977 | Johnson | 126/271 |

FOREIGN PATENT DOCUMENTS

| 1023132 | 3/1953 | France | 126/270 |
| 1328372 | 8/1973 | United Kingdom | 126/271 |

Primary Examiner—Kenneth W. Sprague
Assistant Examiner—James C. Yeung
Attorney, Agent, or Firm—Frederick J. Olsson

[57] ABSTRACT

A group of elongated, thin wall, black, PVC tube-like tanks extending horizontally and parallel to one another in an array. The tank ends are connected to fluid inlet and outlet manifolds. Rapid assembly of tanks and manifolds is facilitated by loose joints between tanks and tapered apertures in manifolds receiving tubular inlets and outlets on tanks. Also, the tubular/taper design makes an interference fit and sets up ideal conditions for liquid welding. Each tank has built in protection in the form of retained fluid in the event of failure of the pumping system.

9 Claims, 4 Drawing Figures

U.S. Patent        Dec. 26, 1978        4,131,110
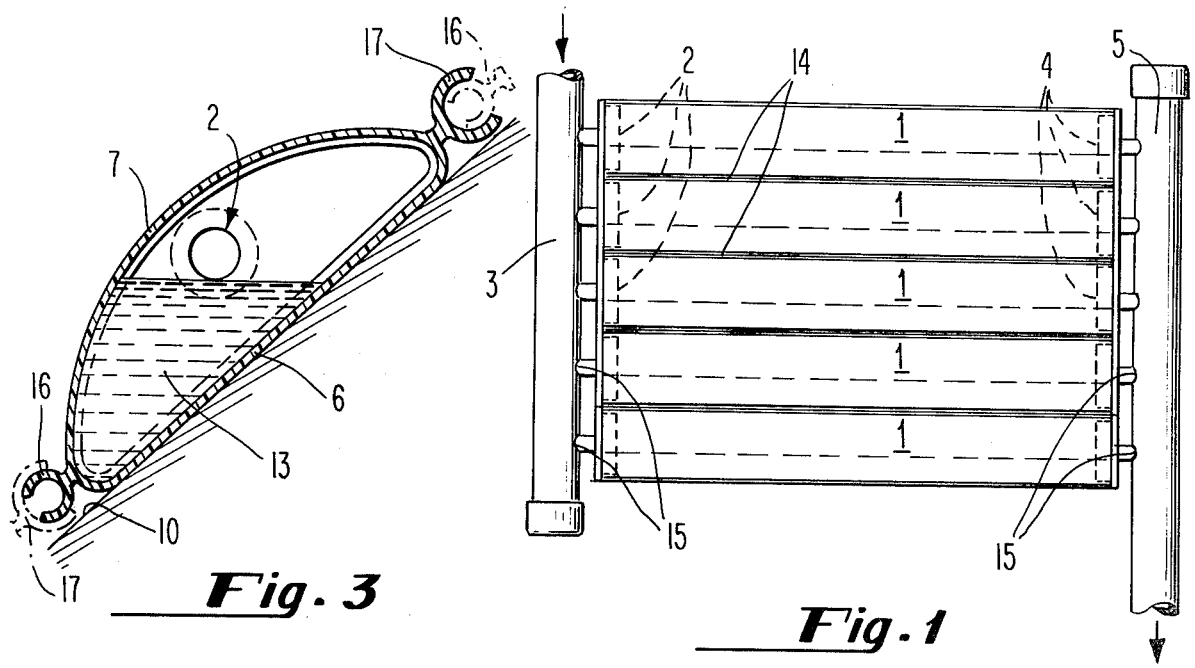
Fig. 3
Fig. 1
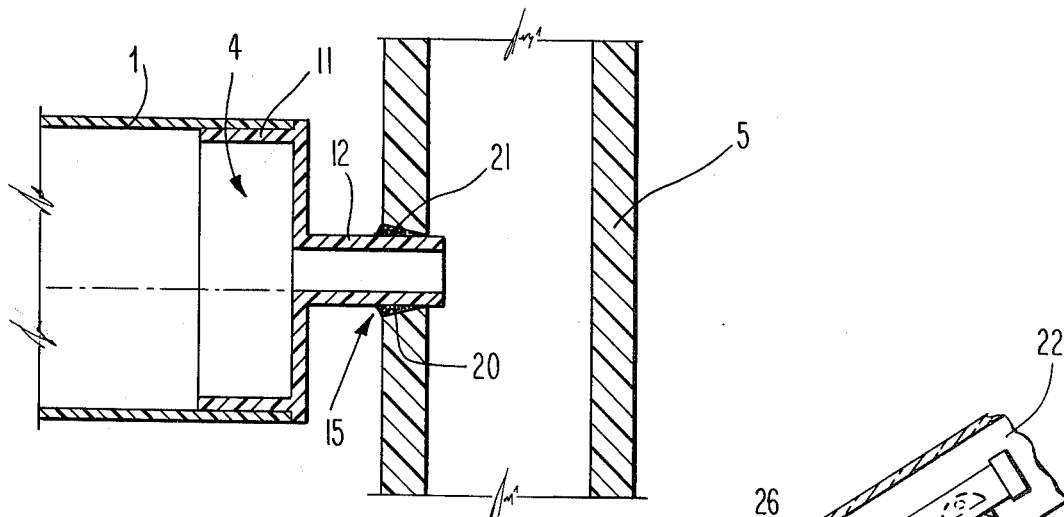
Fig. 4
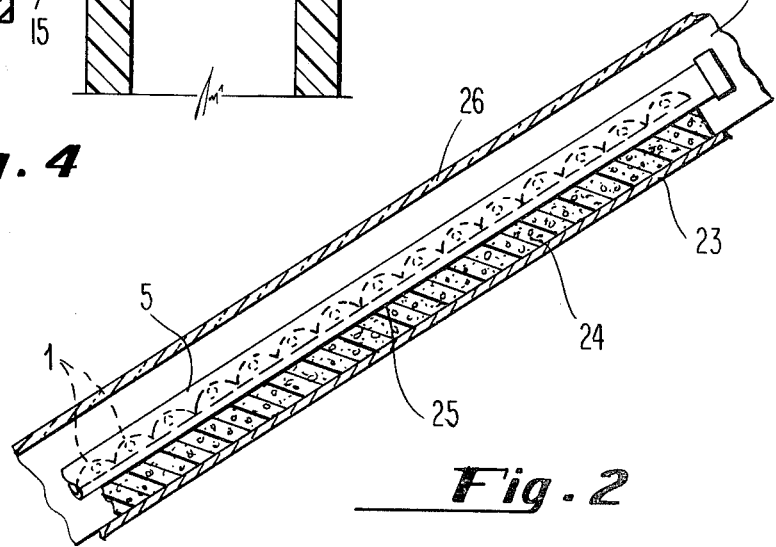
Fig. 2

SOLAR ENERGY ABSORBER

This invention relates to solar energy absorbing devices of the kind wherein the absorbed heat raises the temperature of a fluid which flows to equipment using the same such as a hot water tank, a swimming pool, a heat pump, a hot water heating system and the like.

The invention provides an inexpensive and highly efficient array for absorbing solar energy. The array is composed of a series of individual, horizontal extending tanks which are made up of thin-walled, lens shaped extrusions of black plastic, such as PVC connected to PVC inlet and outlet manifolds.

Most of the solar collecting panels that are presently being used are extremely expensive because they are metallic (such as copper) and they must be quite thick over the entire area of the absorbing panel so that heat can be conducted horizontally through the web and to the heat collecting coils which conduct the liquid. It would be even more costly to build the panel entirely of metallic tubes.

The new invention circumvents the expensive problem and the need for thick metallic web between liquid conducting tubes, by making the entire area of the individual plastic tanks in contact with fluid on the inside of very thin walls to bring the captured solar heat into immediate contact with the conducting fluid without a large heat gradient or drop from the outside to the inside surface. These thin walls enable plastic material to be efficiently used even though it is not good conductor.

The expense of shipping large heavy solar collecting panels is one of the items which greatly effects the fully installed cost. The standard metallic panels are both very bulky and very heavy as well as being susceptible to damage, consequently both the boxing and shipping is very expensive.

In contrast, the new invention is extremely light and yet very rugged because of its thin wall, tubular construction. It lends itself easily to shipping, both by being very light and by being very sturdy and durable, so that very light and inexpensive packaging methods may be used for shipping.

In most solar collecting panels, there is a large metallic web, or backing, welded to a serpentine shaped tube which has a heat conducting fluid running thru it. Efficiency is lowered by the gradient drop between the high temperature points at the center of the web and the points at which the web meets conducting tubing.

The present invention eliminates most of these conduction problems by the use of tanks with very thin walls. Each tank has a lens shaped cross section, which gives an extremely high strength to weight ratio, and allows the heat to flow relatively easy thru the extremely thin walls of plastic tanks.

The invention uses loose fitting ball and socket interlock system between the tanks and also uses tubular inlets and outlets on each tank fitting into tapered apertures in the manifolds. The combination makes assembly of tanks and manifolds very easy in production. The individual tanks are self adjusting and do not pick up cumulative arror (whether plus or minus) which would prevent the proper insertion and fusion of the inlets and outlets to the tapered apertures. The tubular inlets and outlets and the tapered apertures make an interference fit at the innermost part of the aperture and this engagement t together with the outwardly tapering space between tube and aperture ideally conditions the assembly for liquid welding.

Plastic, which can be mass produced through moldings and extrusions dies, has suffered some setbacks in the past because of the vulnerability of the plastic to high temperature conditions in the Southtern states; and especially if the system should run dry of conducting liquiod. Under the protective glass, energy absorbing plates can reach temperatures above 200° which in turn can deform most suitable plastic.

The invention overcomes some of the basic problems of plastic arrays by incorporating very thin walls for the tank so that the solar energy that is absorbed on the outer surface is very close to the absorbing fluid, which carries away the absorbed heat. The problem of heat damage on plastic arrays, which can occur when the array accidentally goes dry in extremely hot climate conditions, is eliminated by the retention of fluid, should the pumping system accidentally shut down.

As the embodiment of the invention will be explained below in connection with the following drawings wherein:

FIG. 1 is a plan view of a solar energy absorber of the invention;

FIG. 2 is a elevational view of the absorber of FIG. 1 set-up in a typical panel arrangement;

FIG. 3 is a cross section of a tank of the invention; and

FIG. 4 is an enlargement cross sectional view showing the manner of connecting a tank to a manifold.

FIG. 1 shows a typical solar energy absorber of the invention. The array comprises a plurality of elongated tanks 1, the inlets 2 of which are connected to an inlet manifold 3 and the outlets of 4 of which are connected to an outlet manifold 5. Fluid is pumped in to the manifold 3 thru the inlets 2, thru the tanks 1, and thru the outlets 4 to the manifold 5 and then to user device and pump. Solar is absorbed by the tank 1 and transferred to the fluid, the heat of which is extracted by the user device. The pump, the controls and the user device not shown as the nature of these will be understood by those skilled in the art.

Each tank 1 is identical in structure and is preferably formed by extruding black PVC plastic. The wall thickness is between 0.015 and 0.030 inches. The tank has a flat rear wall 6 and a front convex wall 7. The wall 6 is for mounting the tank on a supporting surface such as indicated at 10. The convex or lens shape of the front wall 7 enhances the energy absorbing ability of the tank. The flat/convex arrangement provides high strength even though the walls are thin.

The inlets 2 and outlets 4 are identical in construction as shown for the outlet 4 in FIG. 4. The outlet has a hollow plug section 11 and tubular non-tapered section 12. The plug section is liquid welded on the inside of the tank using conventional cold welding liquids. The outlets and inlets are molded from black PVC plastic.

It will be noted from inspection of FIGS. 1, 3 and 4 that the inlet means, particularly the tubular non-tapered sections 12 are spaced inwardly from the periphery of the tank. This is an important feature. The spacing of the inlet and outlet with respect to the periphery of the tank and the horizontal orientation of the tank provides that without flow of fluid thru an inlet to the tank and with the outlet being open to discharge, the portion of the tank below the inlet and outlet will retain a reservoir of fluid. This is indicated in FIG. 3 where it will be seen that the level of the fluid 13 is just below the inlet 2. It will be apparent that the inlet/outlet locations provide for a substantial amount of fluid to be retained at any orientation of the supporting surface 10 between horizontal and vertical.

If pump action ceases and tank fluid is discharged into the outlet manifold, a residual amount of fluid will remain in each tank i.e. the fluid in the tank section below the inlet and outlet. As indicated in previously, this maintains the temperature of the plastic below and within acceptable levels.

It will be understood that during pumping action each tank is filled with fluid. The residual level has been shown simply for purposes of description.

Economical and rapid assembly of tanks and manifolds is made possible by the joint structure 14 between adjacent tanks and the joint structure 15 between the inlet, outlets and manifolds.

The joint structure 14 is indicated in FIG. 3. A ball section 16 and a socket section 17 are disposed on opposite sides of the tank and run co-extensive with the same. The balls 16 are adapted to fit into adjacent sockets 17. The ball/socket structure is dimentioned to have a loose fit. This provides for limited relative motion between adjacent pairs of tanks in directions transverse the axes of the pair. The loose fit is provided by a clearance between 0.005 and 0.010 inches.

The joints 15 between inlets, outlets, and manifolds are identical in structure and the same will be explained in connection with FIG. 4.

Each manifold has several identical apertures depending upon the number of tanks for the array. One of such apertures is indicated at 20. The aperture tapers inwardly and diameter of the innermost part is substantially the same as the outside diameter of the tubular section 12. When the tubular section 12 is within the aperture as shown in Figure the inner most part makes an interference fit with the tubular section. The space between the aperture 20 and tubular section 12 tapers outwardly.

The assembly of the array will next be explained.

First, the various tanks are set-up as shown in FIG. 1 by axially sliding adjacent balls and sockets together. For this operation the tanks are supported in a horizontal position.

Utilizing appropriate fixtures, the manifolds are then brought up so that tapered apertures face the tubular sections on the tanks. The manifolds are then simultaneously pressed toward each other to cause the tubular sections to enter the tapered apertures If there is any misalignment between tanks and manifolds, the tanks can shift due to the looseness of the joints 15. Also the tapered aperture will steer the tubular section into the proper position. When all of the tubular sections have been pressed into the apertures as shown in FIG. 4, the tanks are ready to be joined to the manifolds by liquid welding. Any conventional liquid for welding PVC pipe may be used.

The interference fit between a tapered aperture and a tubular section developes a compression seal. This seal together with the tapered space provides an ideal condition for welding. When the liquid is wiped on the outside the liquid immediately fills the tapered space by capilary action. This insures fusion over the whole wall thickness of the manifold.

In FIG. 4, the tubular section 12, tapered hole 20 and the weld 21 are shown as distinct items. This is for descriptive purposes. It will be understood that the action of the welding liquid is to make a homogeneous joint, i.e. so that the outside surface of the tubular section 12, the weld 21 and the tapered hole are all fused together.

In FIG. 2 I have illustrated a typical panel incorporating the solar energy absorber of the invention. The panel is mounted between two wooden beams of a greenhouse. One of the beams is indicated in 22. A plywood backer 23 extends between the beams and supports a rigid foam insulation panel 24 which cuts conduction loss. The panel 24 carries heat reflecting foil 25 which reflects solar energy back into the tanks. On the outside, the glazing 26 covers the beams. The space at the top and bottom of the panel between the beams and the glazing and plywood is sealed off by means not shown. This provides for insulating dead air space. The solar energy entering thru the glazing 26 impinges upon the tanks 1 and is absorbed and transfered to the flowing liquid in the tanks. The various insulating means mentioned above help minimize heat loss during the absorbing process.

I claim:

1. For a solar energy collector:
   an elongated, thin wall, hollow, plastic tank extending along a horizontal axis to be filled with a heat absorbing fluid, the wall of the tank being capable of absorbing solar energy and conducting the same to said fluid in contact with the wall;
   fluid inlet means adjacent one end of the tank and spaced inwardly from the periphery of the tank;
   fluid outlet means adjacent the opposite end of the tank and spaced inwardly from the periphery of the tank; and
   the spacing of the inlet and outlet means with respect to the periphery of the tank and the horizontal orientation of the tank providing that without flow of fluid thru the inlet to the tank and with the outlet being open to discharge fluid, the portion of the tank below the inlet and outlet means retains a substantial reservoir of fluid to maintain the temperature of the plastic below its deformation temperature.

2. The structure of claim 1 wherein the wall thickness of said tank is between 0.015 and 0.030 inches.

3. The structure of claim 1 wherein the plastic is PVC.

4. The structure of claim 1 wherein the plastic is colored black.

5. The structure of claim 1 wherein the side of the tank which faces and absorbs the solar energy has a convex cross-sectional shape.

6. For a solar energy collector, the combination of:
   a plurality of elongated, thin wall, hollow, plastic tanks extending horizontally and generally parallel to one another each to be filled with heat absorbing fluid and the wall of each tank being capable of absorbing solar energy and conducting the same to fluid therein in contact with the wall;
   on each tank, fluid inlet means on one end and fluid outlet means on the opposite end and the inlet and the outlet means each being spaced inwardly from the periphery of the tank and the spacing of the inlet means and outlet means with respect to the periphery of the tank and the horizontal orientation of the tank providing that without flow of fluid thru the inlet means to the tank and with the outlet means being open to discharge fluid, the portion of the tank below the inlet and outlet means retains a substantial reservoir of fluid to maintain the temperature of the plastic below its deformation temperature;

on each tank, the inlet and outlet means each comprising a hollow plastic plug liquid welded to the tank and having a hollow outwardly extending non-tapered tubular member;

fluid inlet manifold means having a plurality of apertures for respectively receiving one of said inlet tubular members and make an interference fit therewith and each aperture being inwardly tapered; fluid outlet manifold means having a plurality of apertures for respectively receiving one of said outlet tubular members and make an interference fit withwith and each aperture being inwardly tapered; and joint means disposed between adjacent pairs of said tanks for connecting the pair together and providing for limited relative motion between the pair in directions transverse the axes of the pair.

7. In a solar energy collector:

a plurality of elongated, thin wall, hollow, plastic tanks extending horizontally and generally parallel to one another each to be filled with heat absorbing fluid and the wall of each tank being capable of absorbing solar energy and conducting the same to fluid in contact with the wall;

joint means connecting adjacent tanks together;

on each tank, fluid inlet means on one end and fluid outlet means on the opposite end and the inlet and the outlet means each being spaced inwardly from the periphery of the tank and the spacing of the inlet means and outlet means with respect to the periphery of the tank and the horizontal orientation of the tank providing that without flow of fluid thru the inlet means to the tank and with the outlet means being open to discharge fluid, the portion of the tank below the inlet and outlet means retains a substantial reservoir of fluid to maintain the temperature of the plastic below its deformation temperature.

fluid inlet manifold means connected to said inlet means; and fluid outlet manifold means connected to said outlet means.

8. For a solar energy collector:

an elongated, thin wall, hollow, black PVC plastic tank extending along a horizontal axis to be filled with a heat absorbing fluid, the wall of the tank being capable of absorbing solar energy and conducting the same to said fluid in contact with the walls, said wall having a thickness of between 0.015 and 0.030 inches and the side of the tank which faces and absorbs solar energy having a convex cross sectional shape;

fluid inlet means adjacent one end of the tank and spaced inwaredly from the periphery of the tank;

fluid outlet means adjacent the opposite end of the tank and spaced inwardly from the periphery of the tank; and the spacing of the inlet and outlet means with respect to the periphery of the tank and the horizontal orientation of the tank providing that without flow of fluid thru the inlet to the tank and with the outlet being open to discharge fluid, the portion of the tank below the inlet and outlet means retains a substantial reservoir of fluid to maintain the temperature of the plastic below its deformation temperature.

9. For a solar energy collector, the combination of:

a plurality of tanks to be filled with heat absorbing fluid, the tanks being arranged side-by-side and parallel one another;

on each tank, fluid inlet means on one end and fluid outlet means on the opposite end;

on each tank, the inlet and outlet means each comprising a hollow plastic plug liquid welded to the tank and having a hollow outwardly extending non-tapered tubular member;

fluid inlet manifold means having a plurality of apertures for respectively receiving one of said inlet tubular members and make an interference fit wherewith and each aperture being inwardly tapered in a manner to provide that the innermost portion of the taper make said interference fit and provide a conical cavity to receive liquid welding material;

fluid outlet manifold means having a plurality of apertures for respectively receiving one of said outlet tubular members and make an interference fit withwith and each aperture being inwardly tapered in a manner to provide that the innermost portion of the taper make said interference fit and provide a conical cavity to receive liquid welding material;

joint means disposed between adjacent pairs of said tanks for connecting the pair together and providing for limited relative motion between the pair in directions transverse the axes of the pair to accommodate lateral misalignment between manifold apertures and the respective tubular members and thereby facilitate assembly of a manifold and said plurality of tanks; and on each tank, the spacing of the inlet and outlet means with respect to the periphery of the tank and the horizontal orientation of the tank providing for the condition that without flow of fluid thru the inlet means to the tank and with the outlet means being open to discharge fluid, the portion of the tank below the inlet and outlet means retains a substantial reservoir of fluid to maintain the temperature of the plastic below its deformation temperature.

* * * * *